US011983810B1

(12) United States Patent
Merchante

(10) Patent No.: US 11,983,810 B1
(45) Date of Patent: May 14, 2024

(54) PROJECTION BASED HAIR RENDERING

(71) Applicant: Apple Inc., Cupertino, CA (US)

(72) Inventor: Mariano Merchante, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/710,301

(22) Filed: Mar. 31, 2022

Related U.S. Application Data

(60) Provisional application No. 63/179,079, filed on Apr. 23, 2021.

(51) Int. Cl.
*G06T 17/20* (2006.01)
*G06T 15/04* (2011.01)

(52) U.S. Cl.
CPC .............. *G06T 15/04* (2013.01); *G06T 17/20* (2013.01); *G06T 2210/21* (2013.01)

(58) Field of Classification Search
None
See application file for complete search history.

(56) References Cited

U.S. PATENT DOCUMENTS

| | | | | |
|---|---|---|---|---|
| 2003/0184544 | A1* | 10/2003 | Prudent | G06T 13/40 345/419 |
| 2007/0273705 | A1* | 11/2007 | Bruderlin | G06T 13/40 345/581 |
| 2011/0063291 | A1* | 3/2011 | Yuksel | G06T 17/20 345/420 |
| 2013/0121613 | A1* | 5/2013 | Winnemoeller | G06F 3/0484 382/254 |
| 2014/0233849 | A1 | 8/2014 | Weng et al. | |
| 2014/0267225 | A1* | 9/2014 | Zhang | G06T 7/564 345/419 |
| 2016/0247308 | A1* | 8/2016 | Jiao | G06T 15/503 |

(Continued)

FOREIGN PATENT DOCUMENTS

| | | | | |
|---|---|---|---|---|
| KR | 20210052004 | A * | 5/2021 | ............. G06T 15/04 |
| WO | 2019226494 | A1 | 11/2019 | |

OTHER PUBLICATIONS

Raj, Amit, et al. "Learning to generate textures on 3d meshes." Proceedings of the IEEE/CVF Conference on Computer Vision and Pattern Recognition Workshops. 2019.*

(Continued)

*Primary Examiner* — Sultana M Zalalee
(74) *Attorney, Agent, or Firm* — Fernando & Partners, LLP

(57) ABSTRACT

A method is performed at an electronic device with one or more processors and a non-transitory memory. The method includes obtaining hair curve data that represents a plurality of hair strands. Each of the plurality of hair strands includes a respective plurality of hair points. The method includes projecting the plurality of hair strands to a hair mesh that is associated with a virtual agent. The method includes rendering a first subset of the plurality of hair strands in order to generate a hair texture based on a corresponding portion of the projection. The method includes rendering the hair texture in association with the virtual agent in order to generate a display render. In some implementations, the method includes changing the number of hair strands rendered during a particular rendering cycle, enabling dynamic generation of hair textures across rendering cycles.

20 Claims, 7 Drawing Sheets

(56) References Cited

U.S. PATENT DOCUMENTS

| | | | |
|---|---|---|---|
| 2019/0035149 A1 | 1/2019 | Chen et al. | |
| 2019/0266781 A1* | 8/2019 | Khadiyev | G06T 17/10 |
| 2020/0342665 A1* | 10/2020 | Eastham | G06T 19/20 |
| 2021/0241510 A1* | 8/2021 | Kuribayashi | G06F 3/011 |
| 2021/0375038 A1* | 12/2021 | Gourmel | G06T 19/00 |
| 2022/0108511 A1* | 4/2022 | Atkinson | G06T 17/20 |

OTHER PUBLICATIONS

Tobias Gronbeck Andersen et al., "Hybrid fur rendering: combining volumetric fur with explicit hair strands," The Visual Computer 32.6 (2016): 739-749.

Erik S. V. Jansson et al., "Real-Time Hybrid Hair Rendering," EGSR (DL/I). 2019: 1-8.

Sebastian Tafuri, "Strand-based Hair Rendering in Frostbite," Advances in Real-Time Rendering in Games course, SIGGRAPH, 2019: 1-42.

* cited by examiner

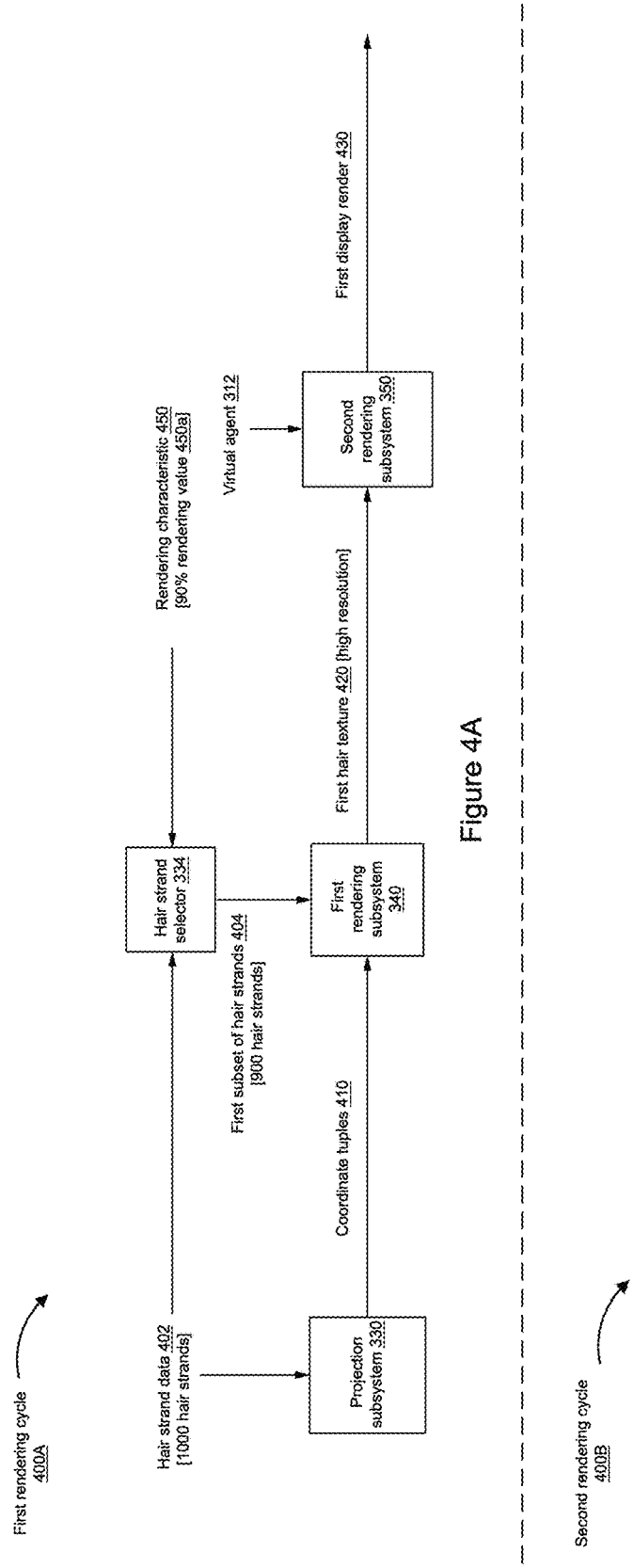
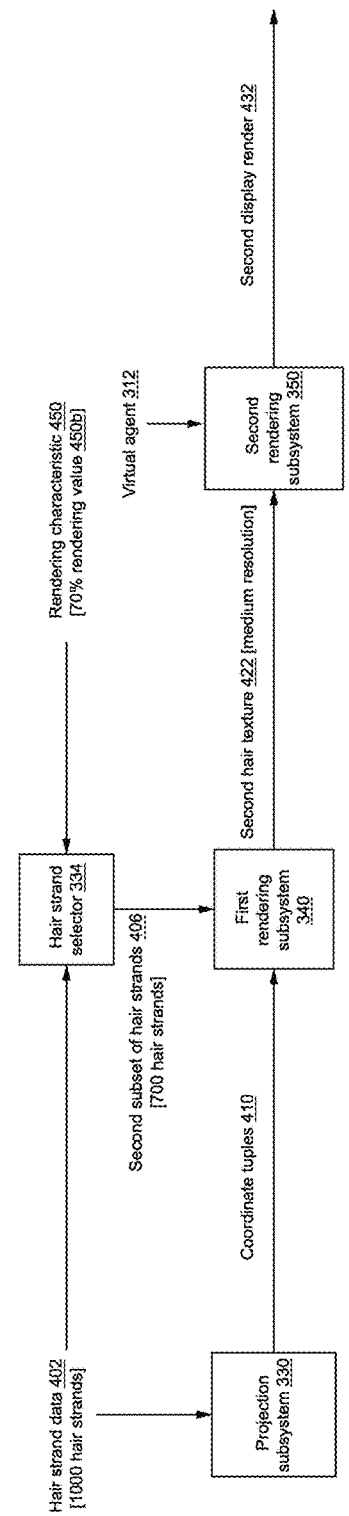
Figure 4A
Figure 4B

PROJECTION BASED HAIR RENDERING

CROSS-REFERENCE TO RELATED APPLICATIONS

This application claims priority to U.S. Provisional Patent App. No. 63/179,079 filed on Apr. 23, 2021, and hereby incorporated by reference in its entirety.

TECHNICAL FIELD

The present disclosure relates to rendering, and in particular rendering hair data.

BACKGROUND

Previously available hair rendering methods have various shortcomings. For example, rendering based on hair card data is computationally expensive due to a relatively large corresponding hair texture size and complexities associated with translating the hair texture. As another example, rendering based on hair strand data is associated with aliasing and strand deformation issues.

SUMMARY

In accordance with some implementations, a method is performed at an electronic device with one or more processors and a non-transitory memory. The method includes obtaining hair curve data that represents a plurality of hair strands. Each of the plurality of hair strands includes a respective plurality of hair points. The method includes projecting the plurality of hair strands to a hair mesh that is associated with a virtual agent. The method includes rendering a first subset of the plurality of hair strands in order to generate a first hair texture based on a corresponding portion of the projection. The method includes generating a first display render by rendering the first hair texture in association with the virtual agent.

In accordance with some implementations, an electronic device includes one or more processors and a non-transitory memory. The one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIGS. 4A-4C are examples of generating different hair textures across corresponding rendering cycles in accordance with some implementations.

DESCRIPTION OF IMPLEMENTATIONS

Figure 1:
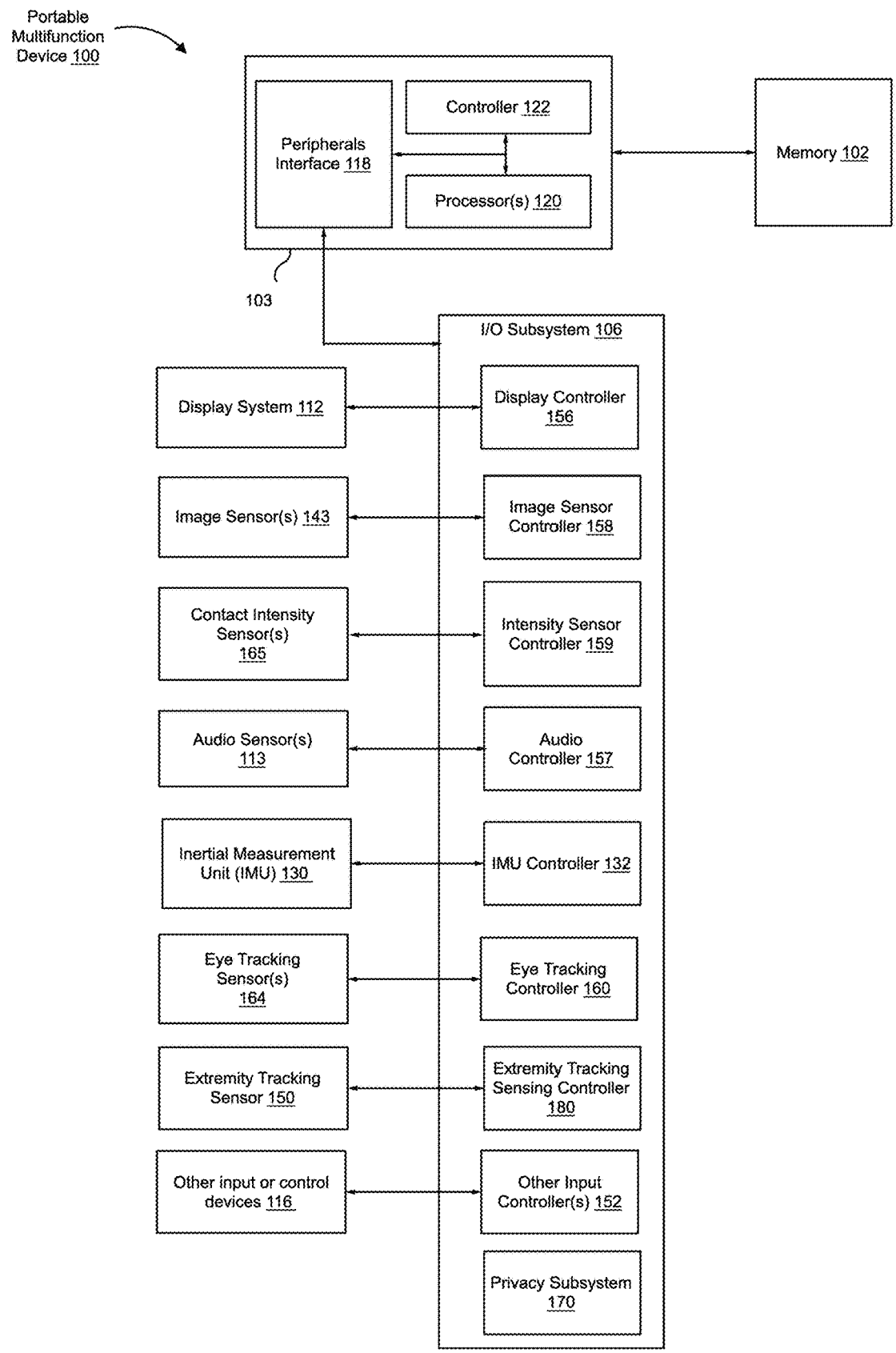
FIG. 1 is a block diagram of an example of a portable multifunction device in accordance with some implementations.

Hair rendering methods have various shortcomings. For example, rendering based on hair card data is computationally expensive due to a relatively large corresponding texture size and complexities associated with translating the texture. Textures associated with hair card data are typically large and difficult to generate, such as by an author pre-generating (e.g., before rendering) the textures. Additionally, rendering based on hair card data is often associated with mipmapped textures. As another example, rendering based on hair strand data is associated with aliasing, as well as hair strand deformation and locality issues.

By contrast, various implementations disclosed herein include methods, systems, and electronic devices for dynamically generating hair textures across corresponding rendering cycles, based on a projection to a hair mesh. The hair mesh is associated with a virtual agent, such as a computer-generated person, a computer-generated animal, etc. For example, the hair mesh corresponds to a two-dimensional (2D) UV map that is associated with a three-dimensional (3D) facial representation of a virtual agent. The method includes rendering a subset of a plurality of hair strands in order to generate a hair texture, based on a corresponding portion of the projection. The plurality of hair strands is represented by hair curve data. Accordingly, various implementations disclosed herein include pre-projecting (e.g., before rendering) hair strands, and using a portion of the projection at render time in order to selectively generate a desired hair texture. For example, a method includes projecting 1,000 hair strands to a hair mesh. Continuing with this example, during a first rendering cycle the method includes generating a high resolution hair texture based on a projection of 900 (of the 1,000) hair strands to the hair mesh, and during a second rendering cycle the method includes generating a lower resolution hair texture based on a projection of 500 (of the 1,000) hair strands to the hair mesh. Selectively generating hair texture across rendering cycles enables the avoidance of aliasing/deformation issues associated with hair strand rendering methods, while enabling the generation of rich hair textures associated with hair card rendering methods. Moreover, the method includes rendering the generated hair texture in association with the virtual agent in order to generate a display render for display.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (e.g., one or more non-transitory computer readable storage mediums), a memory controller 122, one or more processing units (CPUs) 120, a peripherals interface 118, an input/output (I/O) subsystem 106, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, finger-wearable device, and/or a pointer device such as a mouse. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time-of-flight sensor that obtains depth information characterizing a physical object within a physical environment. In some implementations, the other input or control devices 116 include an ambient light sensor that senses ambient light from a physical environment and outputs corresponding ambient light data.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (sometimes referred to herein as "computer-generated content"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a finger-wearable device.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD. For example, the image sensor(s) 143 output image data that represents a physical object (e.g., a physical agent) within a physical environment.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect an eye gaze of a user of the electronic device 100 and generate eye tracking data indicative of a gaze position of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

FIGS. 2A-2D are an example of projecting a plurality of hair strands to a hair mesh in order to generate a hair texture in accordance with some implementations. According to various implementations, the techniques described with reference to FIGS. 2A-2D are performed by an electronic device, such as the electronic device 100 illustrated in FIG. 1. For example, the electronic device corresponds to a tablet, smartphone, wearable device, etc. According to various implementations, the techniques described with reference to FIGS. 2A-2D are performed by a system, such as the system 300 illustrated in FIG. 3. According to various implementations, the techniques described with reference to FIGS. 2A-2D are performed by a HMD.

Figure 2A:
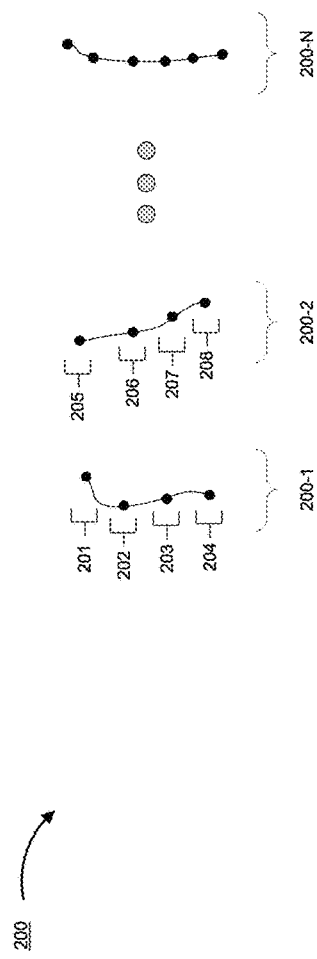
FIGS. 2A-2D are an example of projecting a plurality of hair strands to a hair mesh in order to generate a hair texture in accordance with some implementations.

As illustrated in FIG. 2A, a plurality of hair strands 200 includes a first hair strand 200-1, a second hair strand 200-2, . . . , up to optionally an Nth hair strand 200-N. The plurality of hair strands 200 is represented within hair curve data, such as hair strand data. The hair curve data may indicate various textures values, such as Albedo, Tangent, ID, etc. Each of the plurality of hair strands 200 includes a respective plurality of hair points. Each hair point characterizes a vertex of a corresponding hair strand. For example, the first hair strand 200-1 includes a first hair point 201, a second hair point 202, a third hair point 203, and a fourth hair point 204. As another example, the second hair strand 200-2 includes a fifth hair point 205, a sixth hair point 206, a seventh hair point 207, and an eighth hair point 208. One of ordinary skill in the art will appreciate that the number of hair points that comprise a particular hair strand may be greater than or fewer than four.

Figure 2B:
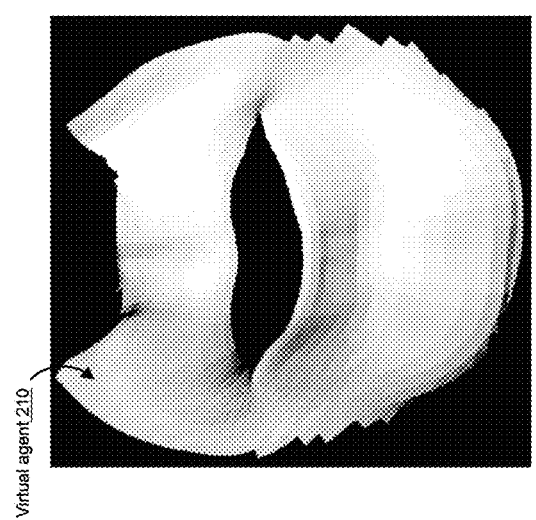

FIG. 2B includes a portion of a virtual agent 210. The portion of the virtual agent 210 corresponds to a three-dimensional (3D) representation of a portion of a face of a person, including the chin and upper lip area of the face. The virtual agent 210 may correspond to a computer-generated object or a computer-generated model, to be rendered for display on a display. For example, an electronic device renders (e.g., via a graphics processing unit (GPU)) the virtual agent 210, and displays the render (e.g., a video frame of the virtual agent) as part of an extended reality (XR) environment. As the electronic device changes position relative to the XR environment (e.g., rotates or moves along an axis of the XR environment), the electronic device updates the render in order to account for the positional change.

Figure 2C:
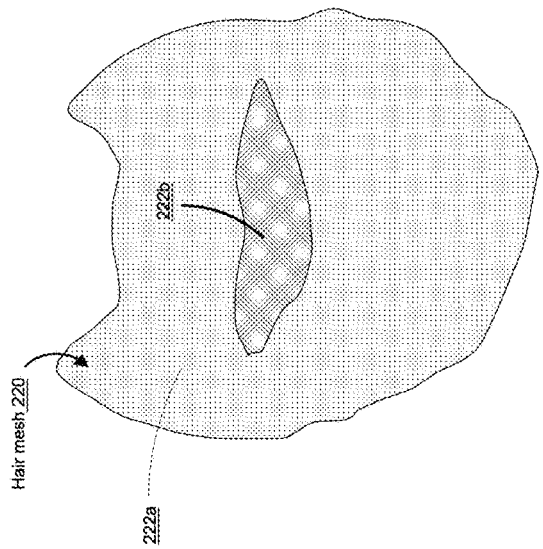

FIG. 2C includes a hair mesh 220 that is associated with the virtual agent 210. The hair mesh 220 includes a hair region 222a onto which hair can be added, and a non-hair region (e.g., the mouth) 222b onto which hair cannot be added. The hair mesh 220 is not textured with hair. For example, the hair mesh 220 corresponds to a hair shell that is indicated within hair card data. As another example, the hair mesh 220 corresponds to a two-dimensional (2D) UV map.

In some implementations, an author generates the hair mesh 220, and spatially associates the hair mesh 220 with the virtual agent 210. For example, an author determines that the virtual agent 210 should have a goatee, and thus generates a hair mesh that corresponds to a goatee silhouette. Continuing with this example, the author places the goatee silhouette at an appropriate position on the virtual agent 210.

Figure 2D:
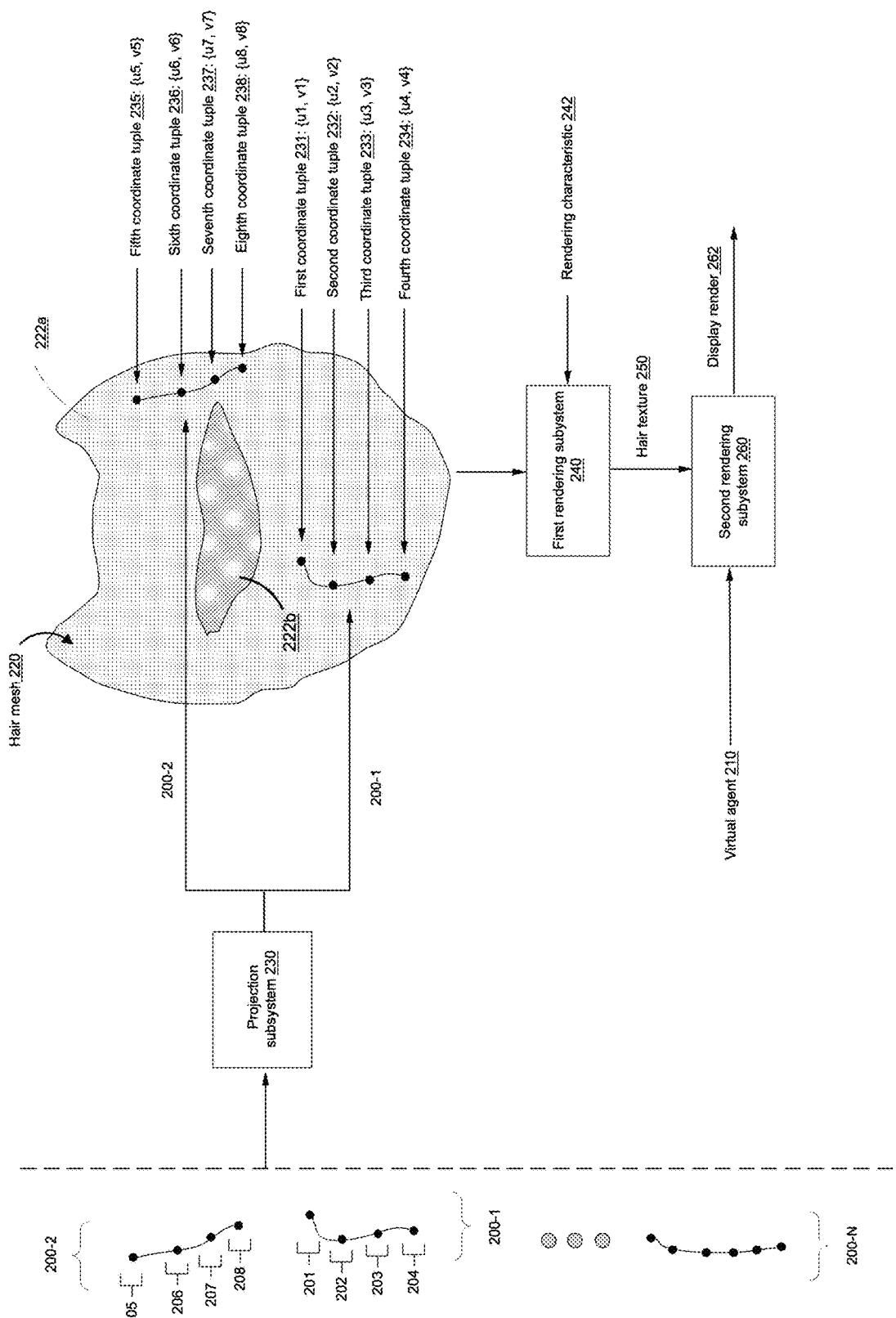

As illustrated in FIG. 2D, a projection subsystem 230 projects the plurality of hair strands 200 to the hair mesh 220. For the sake of clarity, the first hair strand 200-1 and the second hair strand 200-2 are shown projected to respective positions of the hair region 222a. In some implementations, projecting a particular hair strand to the hair mesh 220 includes determining a plurality of coordinate tuples of the hair mesh 220 that is associated with the particular hair strand. Each of the plurality of coordinate tuples indicates a projection of a corresponding one of the respective plurality of hair points of the particular hair strand. For example, projecting the first hair strand 200-1 includes determining a first coordinate tuple 231 $\{u1, v1\}$ associated with the first hair point 201, a second coordinate tuple 232 $\{u2, v2\}$ associated with the second hair point 202, a third coordinate tuple 233 $\{u3, v3\}$ associated with the third hair point 203, and a fourth coordinate tuple 234 $\{u4, v4\}$ associated with the fourth hair point 204. As another example, projecting the second hair strand 200-2 includes determining a fifth coordinate tuple 235 $\{u5, v5\}$ associated with the fifth hair point 205, a sixth coordinate tuple 236 $\{u6, v6\}$ associated with the sixth hair point 206, a seventh coordinate tuple 237 $\{u7, v7\}$ associated with the seventh hair point 207, and an eighth coordinate tuple 238 $\{u8, v8\}$ associated with the eighth hair point 208.

As further illustrated in FIG. 2D, a first rendering subsystem 240 renders (e.g., via a GPU) a subset of the plurality of hair strands 200 in order to generate a hair texture 250, based on a corresponding portion of the projection. In some implementations, the subset of the plurality of hair strands 200 is selected based on a rendering characteristic 242. The rendering characteristic 242 may be a function of resource availability (e.g., processing resources currently available to the GPU), a user preference, a positional value, etc. For example, the rendering characteristic 242 indicates a medium level of GPU utilization, and accordingly the first rendering subsystem 240 renders approximately half of the plurality of hair strands 200. As another example, the rendering characteristic 242 indicates that the virtual agent appears relatively close to a user of an electronic device within an XR environment, and accordingly the first rendering subsystem 240 renders more than a threshold number of (e.g., more than 90%) the plurality of hair strands 200 in order to produce a relatively high resolution hair texture. In some implementations, rendering the subset of the plurality of hair strands 200 occurs in hair card space. Further details regarding utilization of a rendering characteristic are provided with reference to FIGS. 3, 4A-4C, and 5.

As further illustrated in FIG. 2D, a second rendering subsystem 260 renders (e.g., via a GPU) the hair texture 250 in association with the virtual agent 210 in order to generate a display render 262 to be displayed on a display. For example, the display render 262 includes the hair texture 250 overlaid onto a corresponding portion of the virtual agent 210. In some implementations, rendering the hair texture 250 in association with the virtual agent 210 occurs in a world space, such as based on XR settings that define the world space. For example, the second rendering subsystem 260 renders the hair texture 250 onto (e.g., overlaid on) the virtual agent 210 within an XR environment.

Figure 3:
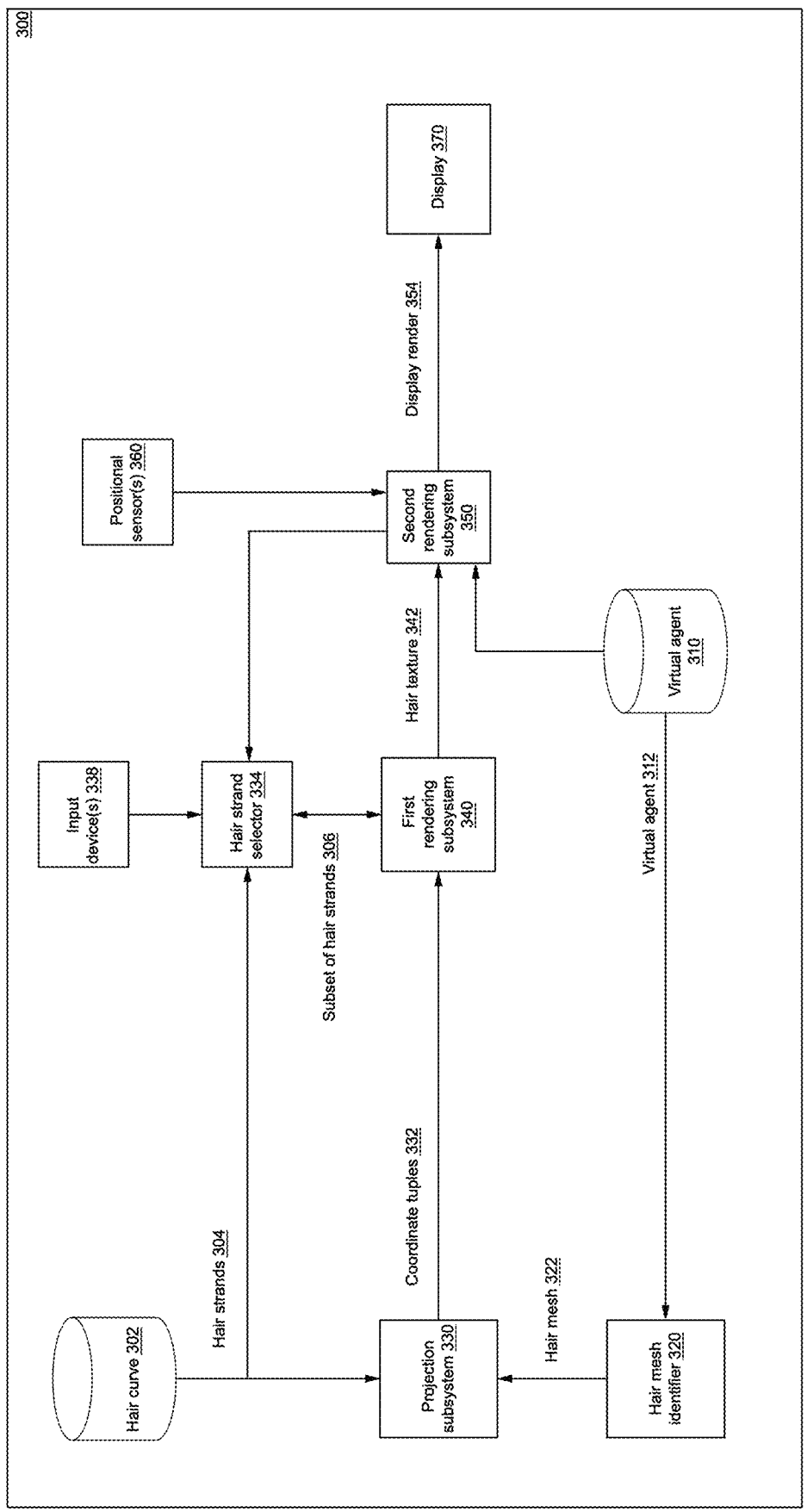
FIG. 3 is an example of a block diagram of a system for projecting a plurality of hair strands in order to generate a hair texture in accordance with some implementations.

FIG. 3 is an example of a block diagram of a system 300 for projecting a plurality of hair strands to a hair mesh in order to generate a hair texture in accordance with some implementations. In some implementations, the system 300 or a portion thereof is integrated in an electronic device.

In some implementations, the system 300 includes a hair curve datastore 302 that stores hair curve data. The hair curve data represents a plurality of hair strands 304. Each of the plurality of hair strands includes a respective plurality of hair points, such as described with reference to the plurality of hair strands 200 illustrated in FIG. 2A.

The system 300 includes a projection subsystem 330 that projects the plurality of hair strands 304 to a hair mesh 322. In some implementations, the projection subsystem 330 is similar to and adapted from the projection subsystem 230 described with reference to FIG. 2D. For example, the projection subsystem 330 determines a plurality of coordinate tuples 332, wherein each of the plurality of coordinate tuples indicates a position (e.g., UV coordinate value) of a corresponding hair point within the hair mesh 322. As one example, with reference to FIG. 2D, the first coordinate tuple 231 corresponds to a UV value {u1, v1} of the first hair point 201, as projected to the hair mesh 220. In some implementations, an author generates the hair mesh 322, and provides the hair mesh 322 (e.g., via an input device 338) to the system 300 for processing by the projection subsystem 330.

In some implementations, the system 300 includes a hair mesh identifier 320 that identifies the hair mesh 322 based on a virtual agent 312. The virtual agent 312 may be stored in a virtual agent datastore 310. For example, in some implementations, the hair mesh identifier 320 performs a computer-vision technique in order to identify the hair mesh 322 within the virtual agent 312. As one example, the hair mesh identifier 320 performs semantic segmentation with respect to the virtual agent 312, and correspondingly obtains various semantic values, such as "nose," "eyes," "head," etc., which are associated with the virtual agent 312. Based on the semantic values, the hair mesh identifier 320 provides, to the projection subsystem 330, pixels of the virtual agent 312 that are suitable candidates onto which hair may be rendered. For example, the hair mesh identifier 320 provides a first set of pixels corresponding to the "head" of the virtual agent 312, but does not provide a second set of pixels corresponding to the "eyes" of the virtual agent 312.

In some implementations, the system 300 includes a hair strand selector 334. The hair strand selector 334 selects a subset of the plurality of hair strands 306 based on a rendering characteristic, and provides the subset of the plurality of hair strands 306 to the first rendering subsystem 340. The first rendering subsystem 340 renders the subset of the plurality of hair strands 306 in order to generate a hair texture 342, based on a corresponding portion of the plurality of coordinate tuples 332. For example, the subset of the plurality of hair strands 306 is less than the entirety of the plurality of hair strands 304.

For example, in some implementations, the rendering characteristic is based on a resource availability level associated with a component of the system 300. As one example, the rendering characteristic indicates a processor availability level and/or storage availability level of the first rendering subsystem 340. The number of the subset of the plurality of hair strands 306 may be proportional to the level of resource availability. Accordingly, during a particular rendering cycle, the first rendering subsystem 340 renders an appropriate number of hair strands in order to generate the hair texture 342. The system 300 therefore avoids aliasing, which may be experienced by a hair strand rendering system that attempts to render too many hair strands in view of the current resource availability of the hair strand rendering system.

As another example, in some implementations, the rendering characteristic is based on a user preference. For example, the system 300 receives a user input that specifies the user preference, such as an input specifying a desired resolution of the hair texture 342. To that end, in some implementations, the system 300 includes one or more input devices 338 that receive the user input. For example, the input device(s) 338 include one or more of an eye tracking sensor, an extremity tracking sensor, etc.

As yet another example, in some implementations, the rendering characteristic is based on a positional value that is associated with the virtual agent 312. For example, the positional value indicates a position of the virtual agent 312 within an XR environment. In some implementations, a second rendering subsystem 350 provides the positional value to the hair strand selector 334. The positional value may include a combination of a depth value (e.g., z value) of the virtual agent 312 and an x-y value of the virtual agent 312. For example, while rendering the virtual agent 312, the second rendering subsystem 350 provides the positional value to the hair strand selector 334. The positional value may be a function of data from one or more positional sensor(s) 360 of the system, such as based on IMU data from an IMU, simultaneous localization and mapping (SLAM) data from a SLAM sensor, etc. As one example, when the positional value indicates a relatively high depth value (e.g., virtual agent 312 is in the scene background and thus not readily perceivable by a user of the system 300), the hair strand selector 334 selects and outputs a correspondingly small subset of the plurality of hair strands 306. Accordingly, the first rendering system 340 generates the hair texture 342 having a relatively low resolution. As a counterexample, when the positional value indicates a relatively low depth value (e.g., virtual agent 312 is in the scene foreground and thus readily perceivable by the user of the system 300), the hair strand selector 334 selects and outputs a correspondingly large subset of the plurality of hair strands 306. Accordingly, the first rendering system 340 generates the hair texture 342 having a relatively high resolution.

The second rendering subsystem 350 renders the hair texture 342 in association with the virtual agent 312 in order to generate a display render 354. In some implementations, the second rendering subsystem 350 is similar to and adapted from the second rendering subsystem 260 described with reference to FIG. 2D. In some implementations, the system 300 includes a display 370 that displays the display render 354. In some implementations, the system 300 does not include a display, and transmits the display render 354 to a separate system that includes a display.

Figure 4C:
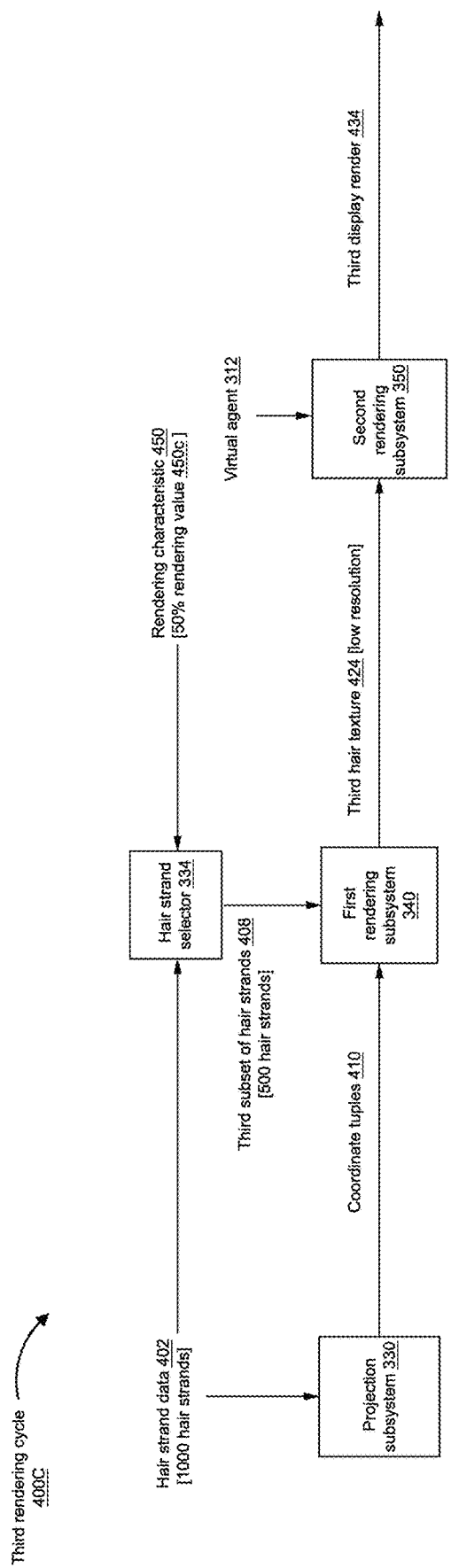

FIGS. 4A-4C are examples of generating different hair textures across corresponding rendering cycles in accordance with some implementations. Generation of the different hair textures is a function of different values of a rendering characteristic. One of ordinary skill in the art will appreciate that the rendering cycles may occur in any order relative to each other.

FIG. 4A illustrates a first rendering cycle 400A associated with the first rendering subsystem 340. The projection system 330 receives hair strand data 402. The hair strand data 402 represents 1,000 hair strands. The projection system 330 projects the 1,000 hair strands to a hair mesh. To that end, the projection system 330 determines a plurality of coordinate tuples 410. Each of the plurality of coordinate tuples 410 indicates a position of a particular hair point within the hair mesh. For example, when each of the 1,000 hair strands includes four hair points, the projection system 330 determines 4,000 coordinate tuples (4 hair points per hair strand x 1,000 hair strands). Based on a rendering characteristic 450 indicating a 90% rendering value 450a, the hair strand selector 334 correspondingly selects 90% of the 1,000 hair strands for rendering. Namely, the hair strand selector 334 selects 900 hair strands as a first subset of the plurality of hair strands 404, and provides the first subset of the plurality of hair strands 404 to the first rendering subsystem 340. For example, the 90% rendering value 450a is based on the first rendering subsystem 340 having a relatively high resource availability level. As another example, the 90% rendering value 450a is based on the virtual agent 312 being near the foreground of a scene, and thus a first hair texture 420 having a high resolution is desirable for a user viewing the first hair texture 420. Accordingly, during the first rendering cycle 400A, the first rendering subsystem 340 generates the first hair texture 420 based on the 900 hair strands and a corresponding portion of the plurality of coordinate tuples 410. The first hair texture 420 has a relatively high resolution, as compared with the second hair texture 422 illustrated in FIG. 4B and the third hair texture 424 illustrated in FIG. 4C. The second rendering subsystem 350 generates a first display render 430 by rendering the first hair texture 420 in association with the virtual agent 312.

FIG. 4B illustrates a second rendering cycle 400B associated with the first rendering subsystem 340. Based on the rendering characteristic 450 indicating a 70% rendering value 450b, the hair strand selector 334 correspondingly selects 70% of the 1,000 hair strands for rendering. Namely, the hair strand selector 334 selects 700 hair strands as a second subset of the plurality of hair strands 406, and provides the second subset of the plurality of hair strands 406 to the first rendering subsystem 340. For example, the 70% rendering value 450b is based on the first rendering subsystem 340 having a medium resource availability level. As another example, the 70% rendering value 450b is based on the virtual agent 312 being in the middle ground of the scene, and thus a second hair texture 422 having a medium resolution is desirable for a user viewing the second hair texture 422. Accordingly, during the second rendering cycle 400B, the first rendering subsystem 340 generates the second hair texture 422 based on the 700 hair strands and a corresponding portion of the plurality of coordinate tuples 410. The second hair texture 422 has a medium resolution. The second rendering subsystem 350 generates a second display render 432 by rendering the second hair texture 422 in association with the virtual agent 312.

FIG. 4C illustrates a third rendering cycle 400C associated with the first rendering subsystem 340. Based on the rendering characteristic 450 indicating a 50% rendering value 450c, the hair strand selector 334 correspondingly selects 50% of the 1,000 hair strands for rendering. Namely, the hair strand selector 334 selects 500 hair strands as a third subset of the plurality of hair strands 408, and provides the third subset of the plurality of hair strands 408 to the first rendering subsystem 340. For example, the 50% rendering value 450c is based on the first rendering subsystem 340 having a low resource availability level. As another example, the 50% rendering value 450c is based on the virtual agent 312 being in the background of the scene, or the hair of the virtual agent 312 not being readily viewable by the user. Accordingly, during the third rendering cycle 400C, the first rendering subsystem 340 generates a third hair texture 424 based on the 500 hair strands and a corresponding portion of the plurality of coordinate tuples 410. Because the relatively low number of the 500 hair strands, the third hair texture 424 has a correspondingly low resolution. The second rendering subsystem 350 generates a third display render 434 by rendering the third hair texture 424 in association with the virtual agent 312.

Figure 5:
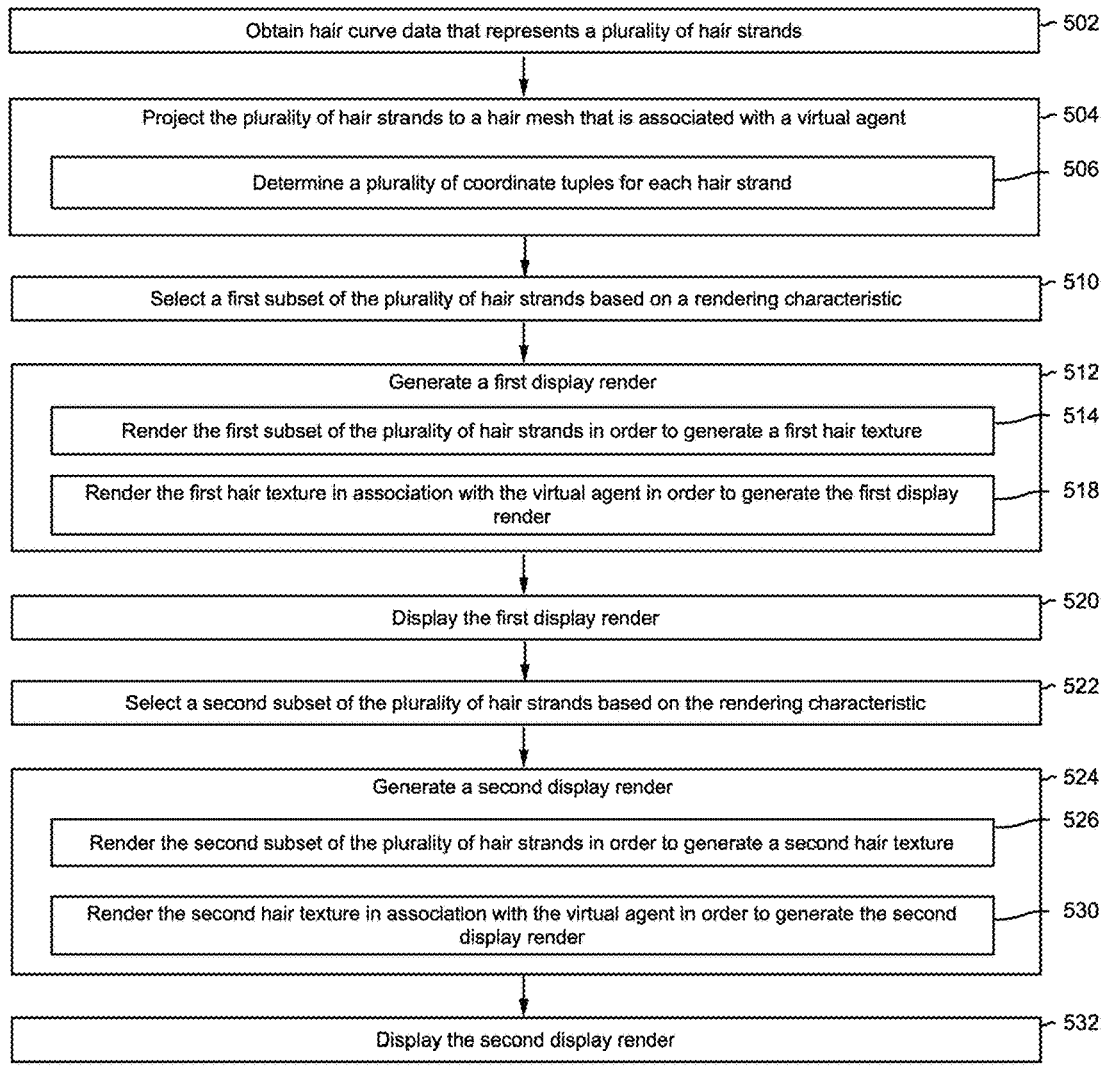
FIG. 5 is an example of a flow diagram of a method of projecting a plurality of hair strands to a hair mesh in order to generate hair textures in accordance with some implementations.

FIG. 5 is an example of a flow diagram of a method 500 of projecting a plurality of hair strands to a hair mesh in order to generate hair textures in accordance with some implementations. In various implementations, the method 500 or portions thereof are performed by an electronic device (e.g., the electronic device 100). In various implementations, the method 500 or portions thereof are performed by the system 300. In various implementations, the method 500 or portions thereof are performed by a mobile device, such as a smartphone, tablet, or wearable device. In various implementations, the method 500 or portions thereof are performed by a head-mountable device (HMD) including a display. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 502, the method 500 includes obtaining hair curve data that represents a plurality of hair strands. Each of the plurality of hair strands includes a respective plurality of hair points. For example, with reference to FIG. 2A, a plurality of hair points 200 includes the first hair strand 200-1 and the second hair stand 200-2. The first hair strand 200-1 includes a first hair point 201, a second hair point 202, a third hair point 203, and a fourth hair point 204. The second hair strand 200-2 includes a fifth hair point 205, a sixth hair point 206, a seventh hair point 207, and an eighth hair point 208. In some implementations, the hair curve data corresponds to hair strand data.

As represented by block 504, the method 500 includes projecting the plurality of hair strands to a hair mesh that is associated with a virtual agent. For example, with reference to FIG. 2D, the projection subsystem 230 projects the plurality of hair points 200 to the hair mesh 220, which is associated with the virtual agent 210. In some implementations, the hair mesh corresponds to a hair shell. The hair mesh may correspond to a 2D map. In some implementations, projecting the plurality of hair strands to the hair mesh occurs in hair strand space.

In some implementations, projecting the plurality of hair strands to the hair mesh is based on a ray trace with respect to the hair mesh. For example, the ray trace intersects with a portion of the hair mesh. The ray trace may be from an expected camera.

In some implementations, projecting the plurality of hair strands to the hair mesh is based on a surface that satisfies a proximity threshold with respect to the hair mesh. For example, projecting the plurality of hair strands is based on a surface that is normal to a UV map.

As represented by block 506, in some implementations, projecting a particular hair strand of the plurality of hair strands includes determining a plurality of coordinate tuples of the hair mesh. The plurality of coordinate tuples is associated with the particular hair strand, and each of the plurality of coordinate tuples indicates a projection of a corresponding one of the respective plurality of hair points of the particular hair strand. For example, in some implementations, the hair mesh corresponds to a UV map, and each of the plurality of coordinate tuples corresponds to a UV coordinate value of the UV map. As one example, a particular coordinate tuple corresponds to a UV coordinate value, such as the first coordinate tuple 231 {u1, v1}, which is associated with the first hair point 201, as illustrated in FIG. 2D. In some implementations, an artist creates the UV map and places it around the virtual agent in an XR environment.

As represented by block 510, in some implementations, the method 500 includes selecting a first subset of the plurality of hair strands based on a rendering characteristic. For example, the rendering characteristic is based on a predefined texture level. The predefined texture level may be defined via a user input. In some implementations, the user input corresponds to an extremity input that indicates a position of an extremity of a user within an environment. The extremity input may be obtained via a computer-vision technique, which identifies a position of an extremity of a user within image data. In some implementations, the user input corresponds to an eye tracking input associated with a user. For example, the method 500 includes generating a higher resolution hair texture (e.g., more hair strands) for a portion of the virtual agent at which a user is gazing, and a lower resolution hair texture (e.g., fewer hair strands) for other portions of the virtual agent. In some implementations, the rendering characteristic is based on a resource availability characteristic associated with an electronic device. For example, the number of the subset of the plurality of hair strands is proportional to a level of resource availability of a component of the electronic device, such as the current processing resource availability of a GPU that renders hair strands in order to generate a hair texture. For example, the hair strand selector 334 selects 900 hair strands for rendering in FIG. 4A, based on a corresponding 90% rendering value 450a of the rendering characteristic 450. As another example, the hair strand selector 334 selects 500 hair strands for rendering in FIG. 4C, based on a corresponding 50% rendering value 450c of the rendering characteristic 450.

As represented by block 512, the method 500 includes generating a first display render. To that end, as represented by block 514, the method 500 includes rendering a first subset of the plurality of hair strands in order to generate a first hair texture, based on a corresponding portion of the projection. In some implementations, rendering the first subset of the plurality of hair strands includes processing, for each of the first subset of the plurality of hair strands, a corresponding plurality of the coordinate tuples. Rendering the first subset of the plurality of hair strands may occur in hair card space. For example, with reference to FIG. 3, the first rendering subsystem 340 renders the subset of the plurality of hair strands 306 in order to generate the hair texture 342, based on a corresponding portion of the plurality of coordinate tuples 332. As discussed with reference to block 510, the first subset of the plurality of hair strands may be selected based on the rendering characteristic.

Moreover, as represented by block 518, the method 500 includes rendering the first hair texture in association with the virtual agent in order to generate the first display render. As represented by block 520, in some implementations, the method 500 includes displaying the first display render. For example, with reference to FIG. 3, the second rendering subsystem 350 renders the hair texture 342 in association with the virtual agent 312, in order to generate the display render 354. As one example, the second rendering subsystem 350 updates the display render 354 based on positional change data (from the positional sensor(s) 360) characterizing the system 300 changing position within an XR environment. For example, based on the system 300 rotating to the left, the second rendering subsystem 350 updates the display render 354 such that the rendered hair texture 342 and the rendered virtual agent 312 appear to move to the right within the XR environment, as viewed on the display 370. In some implementations, rendering the first hair texture occurs in world space, such as based on XR settings. For example, rendering the first hair texture in association with the virtual agent includes rendering the first hair texture on top of (e.g., overlaid onto) the virtual asset in world space. In some implementations, when the virtual agent moves less than a threshold amount in world space, the method 500 includes pre-initializing the first hair texture with an alpha contribution, in order to accelerate the rendering in the world space. In some implementations, rendering the first hair texture includes interpolating with respect to at least a portion of the first hair texture.

According to various implementations, the method 500 includes dynamically generating hair textures, on a per render-cycle basis, based on the value of the rendering characteristic. For example, with reference back to blocks 510 and 514, selecting the first subset of the plurality of hair strands is based on the rendering characteristic having a first value, and rendering the first subset of the plurality of hair strands occurs during a first rendering cycle. As represented by block 522, in some implementations, the method 500 includes selecting a second subset of the plurality of hair strands based on the rendering characteristic having a second value that is different from the first value. The number of the first subset of the plurality of hair strands is different than the number of the second subset of the plurality of hair strands. Moreover, as represented by blocks 524 and 526, the method includes generating a second display render by rendering the second subset of the plurality of hair strands based on a corresponding portion of the projection in order to generate a second hair texture. Rendering the second subset of the plurality of hair strands occurs during a second rendering cycle that is different from the first rendering cycle. For example, with reference to FIG. 4A, during the first rendering cycle 400A the first rendering subsystem 340 generates the first hair texture 420 (e.g., a first video frame), whereas during the second rendering cycle 400B the first rendering subsystem 340 generates the second hair texture 422 (e.g., a second video frame). The first hair texture 420 includes 900 rendered hair strands, whereas the second hair texture 422 includes 700 rendered hair strands. Accordingly, the method 500 enables the generation of hair textures having different resolutions across rendering cycles. Dynamically generating hair textures in this way enables an electronic device to avoid aliasing. Moreover, dynamically generating hair textures enables a fixed rendering cost for a GPU, which in turn may reduce the overall power utilization of the electronic device.

In some implementations, the method 500 includes generating the same hair texture (e.g. re-rendering) across multiple rendering cycles. For example, during first and second rendering cycles the method 500 includes generating a first hair texture, and during a third rendering cycle the method 500 includes generating a second hair texture that is different from the first hair texture. As another example, during a first rendering cycle the method 500 includes generating a first hair texture, and during second and third rendering cycles the method 500 includes generating a second hair texture that is different from the first hair texture.

As represented by block 530, in some implementations, the method 500 includes rendering the second hair texture in association with the virtual agent in order to generate the second display render. For example, as illustrated in FIG. 4A, during the first rendering cycle 400A the second rendering subsystem 350 generates the first display render 430, whereas during the second rendering cycle 400B the second rendering subsystem 350 generates the second display render 432, as illustrated in FIG. 4B. The first display render 430 includes the virtual agent 312 overlaid with a higher resolution hair texture, as compared with the hair texture overlaid on the virtual agent 312 in the second display render 432. As represented by block 532, in some implementations, the method 500 includes displaying the second display render.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed:

1. A method comprising:
at an electronic device including one or more processors and a non-transitory memory:
obtaining hair curve data indicating textures values that represents a plurality of hair strands with hair textures, wherein each of the plurality of hair strands includes a respective plurality of hair points;
projecting the plurality of hair strands to a hair mesh that is associated with a virtual agent to associate the respective plurality of hair points represented by corresponding hair curve data indicating corresponding textures values with coordinates of the hair mesh without hair textures; and
generating a first display render by:
rendering a first subset of the plurality of hair strands in order to generate a first hair texture, based on a corresponding portion of the projection; and
rendering the first hair texture in association with the virtual agent in order to generate the first display render.

2. The method of claim 1, wherein projecting a particular hair strand of the plurality of hair strands includes determining a plurality of coordinate tuples of the hair mesh, wherein the plurality of coordinate tuples is associated with the particular hair strand, and wherein each of the plurality of coordinate tuples indicates a projection of a corresponding one of the respective plurality of hair points of the particular hair strand.

3. The method of claim 2, wherein rendering the first subset of the plurality of hair strands based on the corresponding portion of the projection includes processing, for each of the first subset of the plurality of hair strands, a corresponding plurality of the coordinate tuples.

4. The method of claim 2, wherein the hair mesh corresponds to a UV map, and wherein each of the plurality of coordinate tuples corresponds to a UV value of the UV map.

5. The method of claim 1, wherein projecting the plurality of hair strands is based on a ray trace with respect to the hair mesh.

6. The method of claim 1, wherein projecting the plurality of hair strands is based on a surface that satisfies a proximity threshold with respect to the hair mesh.

7. The method of claim 1, further comprising selecting the first subset of the plurality of hair strands based on a rendering characteristic.

8. The method of claim 7, wherein the rendering characteristic is based on a predefined texture level.

9. The method of claim 7, wherein the rendering characteristic is based on a resource availability characteristic associated with the electronic device.

10. The method of claim 7, wherein selecting the first subset of the plurality of hair strands is based on the rendering characteristic having a first value, the method further comprising:
selecting a second subset of the plurality of hair strands based on the rendering characteristic having a second value that is different from the first value;
generating a second display render by:
rendering the second subset of the plurality of hair strands based on a corresponding portion of the projection in order to generate a second hair texture; and
rendering the second hair texture in association with the virtual agent in order to generate the second display render.

11. The method of claim 10, wherein rendering the first subset of the plurality of hair strands occurs during a first rendering cycle, and wherein rendering the second subset of the plurality of hair strands occurs during a second rendering cycle that is different from the first rendering cycle.

12. The method of claim 1, further comprising providing the first display render to a display to be displayed.

13. The method of claim 1, wherein rendering the first subset of the plurality of hair strands occurs in a hair card space, and wherein rendering the first hair texture occurs in a world space.

14. The method of claim 1, wherein rendering the first hair texture includes interpolating with respect to at least a portion of the first hair texture.

15. A system comprising:
a projection subsystem to:
obtain hair curve data indicating textures values that represents a plurality of hair strands with hair textures, wherein each of the plurality of hair strands includes a respective plurality of hair points; and
project the plurality of hair strands to a hair mesh that is associated with a virtual agent to associate the respective plurality of hair points represented by corresponding hair curve data indicating corresponding textures values with coordinates of the hair mesh without hair textures;
a first rendering subsystem to render a first subset of the plurality of hair strands in order to generate a first hair texture, based on a corresponding portion of the projection; and
a second rendering subsystem to rendering the first hair texture in association with the virtual agent in order to generate a first display render.

16. The system of claim 15, wherein projecting a particular hair strand of the plurality of hair strands includes determining a plurality of coordinate tuples of the hair mesh, wherein the plurality of coordinate tuples is associated with the particular hair strand, and wherein each of the plurality of coordinate tuples indicates a projection of a corresponding one of the respective plurality of hair points of the particular hair strand.

17. The system of claim 15, further comprising a hair strand selector to select the first subset of the plurality of hair strands based on a rendering characteristic.

18. The system of claim 17,
wherein the hair strand selector:
selects the first subset of the plurality of hair strands based on the rendering characteristic having a first value; and
selects a second subset of the plurality of hair strands based on the rendering characteristic having a second value that is different from the first value;
wherein the first rendering subsystem renders the second subset of the plurality of hair strands based on a corresponding portion of the projection in order to generate a second hair texture; and
wherein the second rendering subsystem renders the second hair texture in association with the virtual agent in order to generate a second display render.

19. The system of claim 18, wherein the first rendering subsystem renders the first subset of the plurality of hair strands during a first rendering cycle, and wherein the first rendering subsystem renders the second subset of the plurality of hair strands during a second rendering cycle that is different from the first rendering cycle.

20. A non-transitory computer readable storage medium storing one or more programs, the one or more programs comprising instructions, which, when executed by an electronic device with one or processors, cause the electronic device to:
- obtain hair curve data indicating textures values that represents a plurality of hair strands with hair textures, wherein each of the plurality of hair strands includes a respective plurality of hair points;
- project the plurality of hair strands to a hair mesh that is associated with a virtual agent to associate the respective plurality of hair points represented by corresponding hair curve data indicating corresponding textures values with coordinates of the hair mesh without hair textures; and
- generate a first display render by:
  - rendering a first subset of the plurality of hair strands in order to generate a first hair texture, based on a corresponding portion of the projection; and
  - rendering the first hair texture in association with the virtual agent in order to generate a first display render.

* * * * *